July 28, 1936.  E. D. TILLYER  2,049,094
METHOD OF MAKING OPHTHALMIC LENSES
Filed March 10, 1934
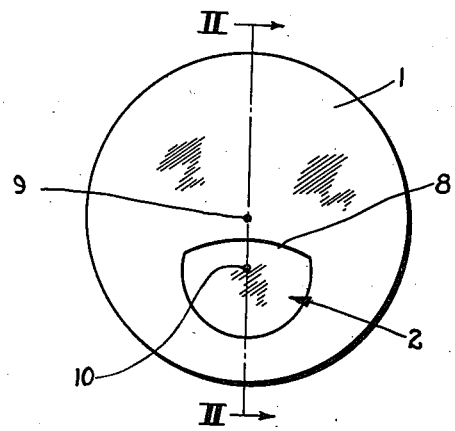
FIG. I.
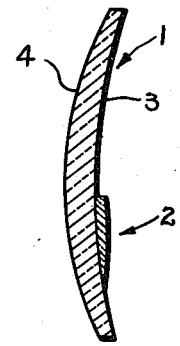
FIG. II.
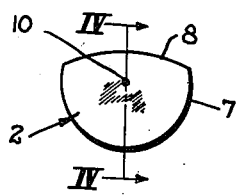
FIG. III.
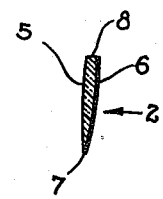
FIG. IV.
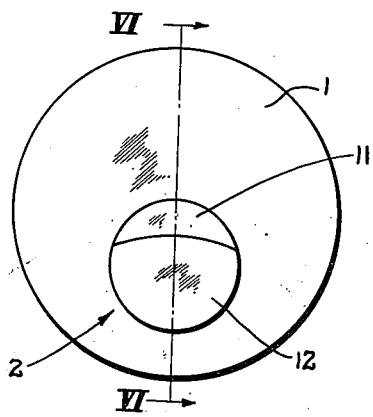
FIG. V.
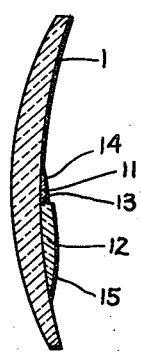
FIG. VI.
INVENTOR
Edgar D. Tillyer.
BY Harry H. Styll
ATTORNEY Patented July 28, 1936

2,049,094

UNITED STATES PATENT OFFICE 2,049,094

METHOD OF MAKING OPHTHALMIC LENSES

Edgar D. Tillyer, Southbridge, Mass., assignor to American Optical Company, Southbridge, Mass., a voluntary association of Massachusetts Application March 10, 1934, Serial No. 714,983

3 Claims. (Cl. 49—82.1)

This invention relates to improvements in ophthalmic lenses and has particular reference to an improved bifocal or multifocal lens and the process of making the same.

One of the principal objects of this invention is to provide means whereby the segment portion of a bifocal or multifocal lens of the fused type may be formed relatively thin as compared with the thickness of a corresponding segment of a bifocal or multifocal lens of the type wherein the segment is fused within a countersink formed in the major portion of the lens and a continuous curve is formed over the major portion and segment insert.

Another important object of the invention is to provide a bifocal or multifocal lens having an odd shaped reading addition formed with a cliff type dividing line between the different focal fields wherein the thickness of the addition or button will be from one-third to one-sixth of the thickness of a corresponding addition or button for a bifocal or multifocal lens of the type wherein the addition is fused within a countersink formed in the major portion of the lens, and wherein the cliff will likewise be reduced over that of a fused in button of the same size, shape, and power.

Another object of the invention is to provide an inexpensive bifocal or multifocal lens and a simple and efficient process of making the same.

Another object is to provide a bifocal or multifocal lens wherein the parts forming the reading and distance portions of the lens may be finished to the desired size and shape, and with the desired optical surfaces prior to being united with each other.

Another object is to provide improved means and an improved process of making a fused bifocal or multifocal lens having an odd shaped reading addition wherein the difficult fusing operations necessary in prior art lenses of this nature are eliminated.

Another object is to provide improved means and process whereby the position of the optical center of the reading field with respect to the optical or geometrical center of the distance field can be definitely controlled.

Another object is to provide improved means and process whereby the position of the dividing line between the reading and distance fields of such lenses can be controlled with respect to the optical or geometrical centers of said fields.

Another object is to provide improved means and process of forming a bifocal or multifocal lens having a prism power in the reading field, and to enable the amount and direction of the prism to be accurately controlled independently of the contour shape of the reading field, so that any desired shape may be employed with any desired amount of prismatic power within reasonable limits and with the base of the prism in any desired direction.

Another object is to provide improved means and process of forming a bifocal or multifocal lens having a cylindrical power in both the reading and distance fields of the lens and in which the cylindrical power of the reading field may be made different from that of the distance field.

Another object is to provide improved means and process of forming bifocal or multifocal lenses wherein a plurality of finished segments of varying powers and shapes may be provided in finished form so that the individual forming the bifocal or multifocal lens may select a segment of the desired nature prior to securing the segment to the major portion of the lens.

Another object is to provide an improved process of uniting the parts of a bifocal or multifocal lens with finished surfaces by fusing wherein the said parts and finished surfaces will not become distorted during the fusing operation.

Another object is to provide means whereby the thickness of the major portion of the lens may be greatly reduced without danger of causing the segment to break through the opposite surface of the lens as has been usual in many instances in the past in bifocal and multifocal lenses of the type wherein the reading addition or segment is fused within a countersink formed in the major portion of the lens.

Another object is to provide simple, efficient, and economical means of producing bifocal and multifocal lenses having incorporated therein a plurality of advantageous features which have hitherto been difficult and in many instances impossible to obtain in lenses of this character.

Other objects and advantages of the invention will become apparent from the following description taken in connection with the accompanying drawing, and it will be understood that many changes may be made in the details of construction, arrangement of parts and steps of the process shown and described without departing from the spirit of the invention as expressed in the accompanying claims. I, therefore, do not wish to be limited to the exact details of construction and steps of the process shown and described, as the preferred forms only have been shown by way of illustration.

Referring to the drawing:

Fig. I is a front elevation of a finished lens embodying the invention.

Fig. II is a sectional view taken on line II—II of Fig. I;

Fig. III is a front elevation of the segment portion of the lens;

Fig. IV is a sectional view taken on line IV—IV of Fig. III;

Fig. V is a view similar to Fig. I showing a modified form of the invention; and Fig. VI is a view similar to Fig. II taken on line VI—VI of Fig. V.

It has been usual in the past, in forming bifocal or multifocal lenses of the fused type to form a countersink in a major portion of glass of a given index of refraction and to fuse a segment of glass of a different index of refraction in the countersink.

This type of lens although efficient in some respects introduced much difficulty in the process of manufacture, particularly in the weaker powers, in that the major portion thereof had a tendency to grind through in the vicinity of the segment when the prescription curve was being formed thereon and the said lens was being reduced to a usable thickness.

In instances in the past wherein it was desired to reduce the prism displacement in passing from the distance field into the reading field, the upper portion of the reading segment of such lenses was cut away to move the dividing line between the different focal fields nearer the optical center of the reading field. This formed a relatively thick dividing line and in the past was very visible in use and subject to producing annoying light reflections. This process also introduced many difficult fusing operations, which in most instances had to be performed separately of each other, and were of such nature as to cause the finished optical surfaces to be formed on the parts only after the fusing operations were completed.

A further difficulty, particularly in lenses of the cliff type wherein the segment portion of the lens was formed of a plurality of pieces of glass, some of which were adapted to blend with the major portion and disappear when fused in the countersink, was that of obtaining a glass having the proper expansion factor to insure good fusion and which would blend with the major portion and disappear when in fused relation with said major portion.

It, therefore, is one of the primary objects of this invention to obviate the above difficulties by providing improved means and process of forming a bifocal or multifocal lens of the fused type wherein the segment may be finished and fused directly to a continuous curve on one face of the blank without danger of having its finished optical surfaces become distorted and which may be formed relatively thin as compared with bifocal or multifocal lenses of the prior art countersink type without danger of grinding through the major portion in the vicinity of the segment.

Another feature of applicant's invention is that of avoiding the difficult prior art edge fusion operations of the past in forming reading fields having odd shaped contours and of providing means whereby the segment portion of the lens may be formed relatively thin and with a thin dividing line between the reading and distance portions of the lens.

Referring more particularly to the drawing wherein like characters of reference designate like parts throughout the several views, the device embodying the invention comprises a major or distance portion 1 and a segment or reading portion 2.

The major or distance portion 1 is formed in a manner similar to that of the usual prior art single vision lenses and may be formed flat or of a maniscus shape having continuous optical surfaces 3 and 4 on the opposite sides thereof, the surface 4 being in practice what is known as the prescription surface and being preferably put on after the segment portion 2 has been secured to the major portion 1.

The segment portion 2 on its side which is adapted to be fused to the surface 3 is provided with a curve 5 of the same or substantially the same radius as the curve of said surface 3 and is preferably spherical. The opposite surface 6 is finished to a curve of the required radius to produce the desired power in the reading field of the lens. The segment 2 may be of any shape desired, that is, circular, semicircular, oval, rectangular or of a three-quarter shape such as shown in Fig. III. The segment 2, as shown in Fig. III, is formed throughout its sides and bottom with an edge 7 which is relatively thin and of the type commonly known in the art as a feather or knife edge and at its top with a relatively thick edge 8, the thick edge being adapted to form the dividing line between the reading and distance portions of the lens. When the parts 1 and 2 are finished with the proper optical curves, the surfaces 3 and 5 which are polished optical surfaces are carefully cleaned so that they preferably can be put by slight pressure in optical contact with each other, it being understood that these surfaces are of the same curvature and that the contact is so intimate that there is substantially no reflection of light at the intersurface. The parts are then subjected to the required temperature to bring about optical contact fusion without causing the finished optical surface to become distorted.

Experience has shown that where two glasses of different molecular arrangement are placed in contact, the two glasses will soften at the spot of contact at a temperature less than they will at points out of contact. This is true of many substances such as for instance camphor and menthol, neither will melt by itself at ordinary room temperature, but if the same are placed in contact with each other at such temperature they will melt.

It is believed that where two glasses having different molecular arrangement are placed in contact with each other they will soften at lower temperatures because the molecules of the surfaces in contact under heat become sufficiently mobile to permit the molecules to interpenetrate and bond together, while the other finished surfaces will not be softened to a point where they will run as there is nothing for them to interbond with.

It is realized that actual and true optical contact is difficult and expensive to accomplish but if alcohol or a liquid is placed between the surfaces the optical contact is enhanced and an inexpensive method of obtaining the necessary contact is provided.

One of the big advantages of the invention is that it allows of mobile dispensation of bifocal or multifocal lenses to the patient. The following procedure may be followed. The manufacturer makes up a plurality of major lenses, with one side finished or certain base curves say 4, 6, 8, and 10 dioptre curves, the same being standard base curves in the art. He also makes up a plurality of minor lenses or segments complete. One side of these segments are made to fit a standard base curve, the other side is variable for required power. The major and minor blanks are supplied the dispenser who is also supplied with a furnace with requisite temperature control for the desired fusing. The dispenser is also supplied data and instructions for assembling, fusing, etc. Then when the prescription is brought the dispenser he simply selects the major and minor blanks required from stock, and fuses them together as directed.

The fusing temperatures are obtained from experimental data for the various kinds of glass used, and the furnace control is regulated accordingly.

It has been found that where there is optical contact, or substantially optical contact between two pieces of glass having finished surfaces on one or both sides that the parts in optical contact may be fused together at a temperature so low as not to distort the finished surfaces and particularly not to distort the finished surfaces on the faces opposite those that are being fused together. In other words lenses having finished surfaces may be fused together without spoiling the said finished surfaces.

It is apparent that due to the surface fusing of the part 2 to the part 1 that the dividing line 8 may be placed in any desired relation with the geometrical or optical center 9 of the part 1, it being merely necessary to position the part 2 in desired relation with the geometrical or optical center 9 prior to fusing the said parts together. It is also apparent that by previously forming the optical center 10 of the part 2 in desired relation to the dividing line 8 that the position of the optical center 10 relative to said dividing line and to the geometrical or optical center 9 may be controlled.

It has been found that in a lens formed in the above manner and having the same prescriptive characteristics as a lens formed by fusing the segment within a countersink formed in the major portion of the lens, that due to the mathematical relations of the parts the thickness of the segment and consequently the thickness of the dividing line 8 may be reduced from one-third to one-sixth of that of a corresponding segment and dividing line of a countersink type lens. This therefore reduces a great amount of the reflections and visibility of the dividing line during the use of the lens. In view of the fact that applicant does not employ a countersink in forming his bifocal or multifocal lens a much thinner major portion 1 may be formed than has been usual in the past in lenses of this character. It is apparent therefore that in lenses having corresponding values applicant's lens will be much lighter and more efficient than the countersink type.

It is apparent that due to the surface contact fusing applicant may form a prism segment of any desired contour shape by first surfacing the faces 5 and 6 of the segment portion 2 to the required relation with each other to produce the desired prismatic power, it being understood that the base of the prism is formed in predetermined relation with the dividing line 8 when the segment is being formed. This prism power may be obtained by the commonly known prior art methods. In this particular instance the segment is cut and edged to the required shape previous to being placed on the lens.

In instances wherein it is desired to form a cylindrical power in the distance portion 1 and the reading portion 2, the surface 4 of the part 1 is provided with the necessary cylindrical curvature to produce the power wanted in the distance portion and the surface 6 of the segment portion 2 is provided with the necessary curvature to produce the cylindrical power wanted in the reading portion, it being understood that the cylindrical powers of the reading or distance fields may be the same or different depending upon the requirements of the lens.

If desired, a trifocal lens may be formed as shown in Figures V and VI, wherein the segment 2 is formed of two pieces of glass, 11 and 12, fused together along the line of joinder 13. The lens in this instance is formed substantially identical to the lens shown in Figures I and II, only in this instance the parts 11 and 12 may be of different indices of refraction, one of which may be substantially the same as that of the major portion 1, or both pieces may be formed of glass which is substantially the same as the major portion 1 but having different surface curvatures 14 and 15 formed thereon. The radius of the surface curvatures 14 and 15 being such as to produce the desired power through said portions of glass, the area of the edge surface 30 13 on the portion 15 being substantially equal to that of the area 8 set forth above and being less than that of a corresponding segment of the countersink type.

The reciprocal relative dispersions of the various pieces of glass forming the major portion 1 and segment or reading portion 2 or the portions 11 and 12 may be such that there will or will not be bad chromatic aberration in the finished lens, depending upon other considerations. It has been found from past practice that even if the segment portion 2 is made of ordinary flint such as is used in the ordinary chromatic fused bifocals, the actual chromatic aberration will be very much less than in lenses of the prior art type having a depressed countersink therein with a flush button.

If it is desired to use a different glass or glass having a lower fusion point for the button 2, the glasses of said button and the major portion must be matched for coefficients of expansion, as is well known in the art.

Applicant attains all of the advantages and desired features of the prior art cement type bifocals which from the standpoint of ease in manufacture and of permitting any desired shape segment to be formed, were perhaps the best type bifocals ever made. Applicant, however, by his improved contact fusing process has overcome the objectionable features of the cement bifocals such as the softening of the cement during use, the cracking loose of the segment portion, and of the cement becoming sticky and collecting dirt, dust, etc., and obstructing the vision of the wearer.

While I have shown a three quarter circle shaped segment with a curved top it is apparent that I may use practically any shape segment common to the so-called cement bifocals. The segment may have a curved top arched upwards or downwards or straight, or straight with fillet ends. The top may be above, below or on the optical center of the segment itself. The segment may have various shapes such as square, rectangular, triangular or a combination of straight and curved lines as desired. As the segment is cut and finished to shape before fusing it is clear that it can be made practically any desired shape or size.

From the foregoing description it will be seen that I have provided simple, efficient, and economical means and process of accomplishing all of the objects and advantages of the invention.

Having described my invention I claim:

1. The method of making a multifocal lens comprising forming a continuous optical surface on one side of a major piece of lens medium to a curvature producing an element controlling the focal power of the finished major focal field of the lens, forming a minor piece of lens medium with an optical surface on one side thereof complemental to the finished optical surface on said major piece of lens medium and with a finished optical surface on the opposite side thereof of such a curvature that when the said minor portion is combined with the finished major portion it will produce the power desired in the minor focal field of the lens, finishing said minor portion to the desired contour shape, placing said minor portion on the major portion with the complemental surfaces in substantially intimate optical contact whereby the finished optical surface of the major portion will extend beyond the limits of the minor portion and subjecting the fitted portions of the lens medium to heat of such a temperature as to produce surface fusion at said fitted complemental surfaces without destroying the optical properties of the finished optical surfaces on said major and minor portions.

2. The method of making a multifocal lens comprising forming a continuous optical surface on one side of a major piece of lens medium to a curvature producing an element controlling the focal power of the finished major focal field of the lens, forming a minor piece of lens medium with an optical surface on one side thereof complemental to the finished optical surface on said major piece of lens medium and with a finished optical surface on the opposite side thereof of such a curvature that when the said minor portion is combined with the finished major portion it will produce the power desired in the minor focal field of the lens, finishing said minor portion to a predetermined contour shape having a portion of its contour substantially circular in outline and a portion cut transversely relative to a continuation of said circular outline and having an edge thickness greater than the edge thickness of said portion having the circular outline, placing said minor portion on the major portion with the complemental surfaces in substantially intimate optical contact and with the transverse portion of the minor portion forming the upper dividing line between said minor and major focal fields of the finished lens whereby the finished optical surface of the major portion will extend beyond the limits of the minor portion and subjecting the fitted portions of the lens medium to heat of such a temperature as to produce surface fusion at said fitted complemental surfaces without destroying the optical properties of the finished optical surfaces on said major and minor portions.

3. The method of making a multifocal lens comprising forming a continuous optical surface on one side of a major piece of lens medium to a curvature producing an element controlling the focal power of the finished major focal field of the lens, forming a minor piece of lens medium with an optical surface on one side thereof complemental to the finished optical surface on said major piece of lens medium and with a finished optical surface on the opposite side thereof of such a curvature that when the said minor portion is combined with the finished major portion it will produce the power desired in the minor focal field of the lens, finishing said minor portion to the desired contour shape, placing said minor portion on the major portion with the complemental surfaces in substantially intimate optical contact whereby the finished optical surface of the major portion will extend beyond the limits of the minor portion and simultaneously placing a liquid between said surfaces to bring about optical contact and subjecting the fitted portions of the lens medium to heat of such a temperature as to produce surface fusion at said fitted complemental surfaces without destroying the optical properties of the finished optical surfaces on said major and minor portions.

EDGAR D. TILLYER.